United States Patent [19]
Reinhold, III et al.

[11] Patent Number: 5,792,239
[45] Date of Patent: Aug. 11, 1998

[54] SEPARATION OF GASES BY PRESSURE SWING ADSORPTION

[75] Inventors: Herbert Edward Reinhold, III, The Woodlands, Tex.; Kent S. Knaebel, Plain City, Ohio; Mark Huber, Andrews; David R. King, Houston, both of Tex.

[73] Assignee: Nitrotec Corporation, New York, N.Y.

[21] Appl. No.: 680,059

[22] Filed: Jul. 15, 1996

Related U.S. Application Data

[63] Continuation-in-part of Ser. No. 326,916, Oct. 21, 1994, Pat. No. 5,536,300.

[51] Int. Cl.$^6$ .................................................. B01D 53/047
[52] U.S. Cl. ........................ 95/101; 95/102; 95/103; 95/105; 95/139; 95/143
[58] Field of Search ........................ 95/96–98, 100–105, 95/139, 141–147, 901, 903

[56] References Cited

U.S. PATENT DOCUMENTS

| | | | |
|---|---|---|---|
| 3,085,379 | 4/1963 | Kiyonaga et al. | 95/97 X |
| 3,101,261 | 8/1963 | Skarstrom | 95/98 |
| 3,141,748 | 7/1964 | Hoke et al. | 95/99 |
| 3,246,449 | 4/1966 | Stern et al. | 95/53 |
| 3,324,626 | 6/1967 | Dresser et al. | 95/39 |
| 3,350,080 | 10/1967 | Garwin | 62/24 |
| 3,636,679 | 1/1972 | Batta | 95/100 |
| 3,683,589 | 8/1972 | Seitz et al. | 95/26 |
| 3,751,878 | 8/1973 | Collins | 95/105 |
| 3,797,201 | 3/1974 | Tamura | 95/105 |

(List continued on next page.)

FOREIGN PATENT DOCUMENTS

| | | |
|---|---|---|
| 071553 | 2/1983 | European Pat. Off. . |
| 092 695 | 11/1983 | European Pat. Off. . |
| 0 394 947 | 10/1990 | European Pat. Off. . |
| 4-90819 | 3/1992 | Japan . |
| WO 88/09306 | 12/1988 | WIPO . |

OTHER PUBLICATIONS

C. Tannehill et al; Nitrogen Removal Costs Vary By Concentration; The American Oil & Gas Reporter; pp. 54–61; May 1994.

R. J. Buras et al; Nitrogen Rejection with Pressure Swing Adsorption: Principles, Design, and Remote Control using an Expert System — Univ. of Oklahoma Laurance Reid Gas Conf.; pp. 93–101; Feb. 28 –Mar. 2, 1994.

T.C. Frankiewicz et al; Methane/Nitrogen Gas Separation over the Zeolite Clinoptilolite by the Selective Adsorption of Nigrogen; American Chemical Society, pp. 213–233; 1983.

(List continued on next page.)

*Primary Examiner*—Robert Spitzer
*Attorney, Agent, or Firm*—Cammarata & Grandinetti

[57] ABSTRACT

A natural gas feed stream containing significant quantities of nitrogen and/or carbon dioxide can be increased to a content of greater than 95 percent by volume of natural gas, and preferably greater than about 98 percent, by passing the natural gas feed stream sequentially through three adsorbent beds that are cycled through seven phases comprising: an adsorption phase to adsorb a first gas, a first depressurization phase to remove feed gas from the voids in the adsorbent bed, a recycle phase to remove a second gas from the adsorbent by the passage of a second depressurization gas therethrough and to produce a recycle gas, a second depressurization phase to reduce the adsorbent bed pressure to about ambient and to produce the second depressurization gas, an evacuation phase where the pressure in the adsorbent is further reduced and an enriched primary gas product stream recovered, a pressurization phase where the pressure in the adsorbent bed is increased using secondary product gas from a bed in an adsorption phase, and further pressurizing the adsorbent bed in a pressurization phase by the flow of the recycle gas and feed gas into the adsorbent bed. Various gases can be separated using this process. Nitrogen can be removed from natural gas (adsorbed gas) and carbon dioxide (adsorbed gas) can be removed from natural gas.

20 Claims, 3 Drawing Sheets

U.S. PATENT DOCUMENTS

| | | | |
|---|---|---|---|
| 3,838,553 | 10/1974 | Doherty | 95/98 |
| 3,944,400 | 3/1976 | Bird | 95/11 |
| 4,077,779 | 3/1978 | Sircar et al. | 95/26 |
| 4,077,780 | 3/1978 | Doshi | 95/100 |
| 4,171,207 | 10/1979 | Sircar | 95/101 |
| 4,305,734 | 12/1981 | McGill | 95/102 |
| 4,444,572 | 4/1984 | Avon et al. | 95/97 |
| 4,512,780 | 4/1985 | Fuderer | 95/100 |
| 4,529,412 | 7/1985 | Hayashi et al. | 95/96 |
| 4,539,020 | 9/1985 | Sakuraya et al. | 95/101 |
| 4,578,089 | 3/1986 | Richter et al. | 95/101 |
| 4,581,044 | 4/1986 | Uno et al. | 95/96 |
| 4,599,094 | 7/1986 | Werner et al. | 95/101 |
| 4,661,125 | 4/1987 | Haruna et al. | 95/102 |
| 4,666,468 | 5/1987 | Wu | 95/47 |
| 4,675,030 | 6/1987 | Czarnecki | 85/39 |
| 4,687,498 | 8/1987 | Maclean et al. | 95/98 X |
| 4,689,062 | 8/1987 | Maclean et al. | 95/99 X |
| 4,690,695 | 9/1987 | Doshi | 95/55 |
| 4,701,187 | 10/1987 | Choe et al. | 95/53 |
| 4,705,541 | 11/1987 | Sircar | 95/98 |
| 4,711,645 | 12/1987 | Kumar | 95/98 |
| 4,717,407 | 1/1988 | Choe et al. | 95/53 X |
| 4,732,577 | 3/1988 | Koizumi et al. | 95/101 |
| 4,750,925 | 6/1988 | Maclean et al. | 95/96 X |
| 4,752,311 | 6/1988 | Maclean et al. | 95/128 X |
| 4,765,804 | 8/1988 | Lloyd-Williams et al. | 95/54 |
| 4,770,676 | 9/1988 | Sircar et al. | 95/99 |
| 4,784,672 | 11/1988 | Sircar | 95/97 |
| 4,790,858 | 12/1988 | Sircar | 95/101 |
| 4,813,977 | 3/1989 | Schmidt et al. | 95/102 |
| 4,813,980 | 3/1989 | Sircar | 95/101 |
| 4,816,039 | 3/1989 | Krishnamurthy et al. | 95/97 |
| 4,836,833 | 6/1989 | Nicholas et al. | 95/55 |
| 4,846,851 | 7/1989 | Guro et al. | 95/100 |
| 4,861,361 | 8/1989 | Jain et al. | 95/96 X |
| 4,863,492 | 9/1989 | Doshi et al. | 95/98 X |
| 4,869,894 | 9/1989 | Wang et al. | 95/101 X |
| 4,892,565 | 1/1990 | Schmidt et al. | 95/101 |
| 4,913,709 | 4/1990 | Kumar | 95/100 |
| 4,914,218 | 4/1990 | Kumar et al. | 95/100 |
| 4,915,711 | 4/1990 | Kumar | 95/101 |
| 5,004,482 | 4/1991 | Haas et al. | 95/96 X |
| 5,006,132 | 4/1991 | DiMartino, Sr. et al. | 95/53 |
| 5,013,334 | 5/1991 | Maurer | 95/100 |
| 5,015,272 | 5/1991 | Okada et al. | 95/100 X |
| 5,026,406 | 6/1991 | Kumar | 95/101 |
| 5,064,446 | 11/1991 | Kusuki et al. | 95/53 |
| 5,080,694 | 1/1992 | Knoblauch et al. | 95/101 X |
| 5,089,048 | 2/1992 | Knoblauch et al. | 95/103 |
| 5,112,590 | 5/1992 | Krishnamurthy et al. | 95/102 X |
| 5,133,785 | 7/1992 | Kumar et al. | 95/101 |
| 5,156,656 | 10/1992 | Parker et al. | 95/53 |
| 5,171,333 | 12/1992 | Maurer | 95/100 |
| 5,174,796 | 12/1992 | Davis et al. | 95/100 |
| 5,207,806 | 5/1993 | Lagree et al. | |
| 5,224,350 | 7/1993 | Mehra | 62/17 |
| 5,226,931 | 7/1993 | Combier | |
| 5,232,473 | 8/1993 | Karpoor et al. | |
| 5,234,472 | 8/1993 | Krishnamurthy et al. | 95/98 |
| 5,248,322 | 9/1993 | Kumar | 95/101 |
| 5,254,154 | 10/1993 | Gauthier et al. | 95/100 X |
| 5,332,424 | 7/1994 | Rao et al. | 95/47 |
| 5,344,480 | 9/1994 | Schulte et al. | 95/52 |
| 5,354,346 | 10/1994 | Kumar | 95/101 |
| 5,354,547 | 10/1994 | Rao et al. | 423/650 |
| 5,382,280 | 1/1995 | Choe et al. | 95/98 |
| 5,411,721 | 5/1995 | Doshi et al. | 423/220 |
| 5,507,856 | 4/1996 | Rao et al. | 95/50 |
| 5,536,300 | 7/1996 | Reinhold, III et al. | 95/101 |
| 5,542,966 | 8/1996 | D'Amico et al. | 95/103 X |
| 5,565,018 | 10/1996 | Baksh et al. | 95/100 |

OTHER PUBLICATIONS

L.H. Shendalman et al; A Study of Heatless Adsorption in the Model System $CO_2$ in He, I; Chemical Engineering Science, vol. 27, pp. 1449–1458; 1972.

J.E. Mitchell et al; Study of Heatless Adsorption in the Model System $CO_2$ in He: Part II, Esso Research and Engineering Co.; pp. 25–32 1973.

H. C. Cheng et al; Recovery and Purification of Light Gases by Pressure Swing Absorption;l American Chemical Sociey; pp. 195–211; 1983.

D.E. Kowler et al; The Optimal Control of a Periodic Adsorber; Univ. of Michigan pp. 1207–1219; Nov. 1972.

P.H. Turnock et al; Separation of Nitrogen and Methane via Periodic Adsorption; Univ. of Michigan; vol.17, No. 2, pp. 335–342; Mar. 1971.

H.C. Cheng et al; Separation of Helium–Methane Mixtures by Pressure Swing Adsorption; AIChE Journal; vol. 31, No. 1, pp. 95–102; Jan. 1985.

M. W. Ackley et al; Kinetic Separation by Pressure Swing Adsorption: Method of Characteristics Model; AIChE Journal; vol. 36; pp. 1229–1238; Aug. 1990.

G. Bird et al; Separation of Nitrogen from Helium Using Pressure–Swing Adsoprtion; Univ. of Bradford, United Kingdom, pp.463–473; 1973.

M.S.A. Baksh et al; A New Composite Sorbent for Methane–Nitrogen Separation by Adsorption; Separation Science and Technology; pp. 845–868; 1990.

| ADSORBENT BED / TIME | ADSORBENT BED A | ADSORBENT BED B | ADSORBENT BED C |
|---|---|---|---|
| 120 SECONDS | PRESSURIZATION + ADSORPTION | DEPRESSURIZATION + RECYCLE | EVACUATION |
| 120-240 SECONDS | DEPRESSURIZATION + RECYCLE | EVACUATION | PRESSURIZATION + ADSORPTION |
| 240-360 SECONDS | EVACUATION | PRESSURIZATION + ADSORPTION | DEPRESSURIZATION + RECYCLE |

SEPARATION OF GASES BY PRESSURE SWING ADSORPTION

This application is a continuation-in-part of U.S. application Ser. No. 08/326,916 filed Oct. 21, 1994, now U.S. Pat. No. 5,536,300.

FIELD OF THE INVENTION

This invention relates to a process for increasing the content of primary gases in a primary gas stream containing other gases. More particularly, this invention relates to a process for the purification of a primary gas stream by the selective adsorption of primary gases, the rejection of secondary gases, and the subsequent desorption of primary gases to produce an enriched primary gas stream. In a particular embodiment, this invention relates to such a separation using pressure swing adsorption techniques.

BACKGROUND OF THE INVENTION

There are various ways to separate gases. An effective way to separate many gases is through pressure swing adsorption. In pressure swing adsorption, a component of a gas stream is selectively adsorbed onto an adsorbent. Other components that are less highly adsorbed are concentrated and pass through the adsorbent bed and can be collected as one of the products. After an adsorbent bed has become loaded with the highly selectively adsorbed component, the adsorbent bed can undergo regeneration by reducing the pressure and recovering the selectively adsorbed component. An intermediate step can involve flowing a concentrated stream of the highly adsorbed component through the bed. Such a step concentrates the highly adsorbed component in the bed while producing an exit stream which is about at feed gas composition. The order in which the process steps are performed can influence the cost effectiveness of the process.

The cost effectiveness of a pressure swing adsorption process is dependent on the capital cost of the pressure swing adsorption system and the operating cost. The present process is an improvement over prior processes with regard to both costs. There is a reduced capital cost since fewer adsorbent beds are needed. This reduces the amount of tanks, valves and piping that is needed. On the operating side, there is greater cost effectiveness since the process is conducted at a relatively low pressure and fewer streams need to be increased in pressure and fuel gas would be available. For instance, a recycle feed gas does not have to be compressed and pressurized as in U.S. Pat. No. 5,536,300.

The processes in this application for patent in preferred embodiments are very effective for the separation of nitrogen from natural gas and natural gas from carbon dioxide. In the separation of nitrogen from natural gas, the natural gas is preferentially adsorbed with the nitrogen passing through the adsorbent bed. In the separation of natural gas from carbon dioxide, the carbon dioxide is preferentially adsorbed with the natural gas passing through the adsorbent bed. All of these gases can be recovered and used. Commercially valuable products are natural gas and carbon dioxide. As used in this application the term natural gas denotes a gas stream that primarily is methane with small amounts of other lower alkanes and some alkenes.

It is known to enrich natural gas using pressure swing adsorption techniques. In U.S. Pat. No. 5,171,333 there is disclosed a technique using four adsorbent beds, each of which contains a faujasite adsorbent. Each bed in sequence goes through an adsorption step, a desorption step by lowering the pressure and then a repressurization step to bring a bed back up to adsorption pressure. The adsorption step is conducted at about 100 to 500 psia and consists of passing a feed gas into an adsorbent bed. The desorption step consists of cocurrently depressurizing an adsorbent bed and passing the gas to a bed undergoing repressurization, further cocurrently depressurizing the adsorbent bed and passing the gas as a purge gas to a bed undergoing purging, countercurrently depressurizing and collecting a methane/ethane stream and countercurrently purging the adsorption zone with a purge gas from another adsorbent bed and recovering ethane. The repressurization step consists of repressurizing the adsorbent bed by cocurrently passing a repressurization gas into the adsorbent bed and further repressurizing the adsorbent bed by passing a portion of the adsorption effluent from another adsorbent bed to this adsorbent bed.

In U.S. Pat. No. 5,174,796 there is disclosed a pressure swing adsorption process for enriching a natural gas stream which contains nitrogen. A carbon adsorbent is used and the natural gas is preferentially adsorbed. The process steps consist of cocurrent adsorption, a first cocurrent depressurization and the use of a part of this gas to repressurize another adsorbent bed, cocurrently depressurizing the adsorbent bed to a yet lower pressure and withdrawing a fuel gas stream, countercurrently depressurizing the adsorbent bed and recovering a product gas, countercurrently purging the adsorbent bed and recovering additional product gas, then countercurrently repressurizing the adsorbent bed in two repressurization steps with nitrogen gas from another adsorbent bed. This repressurization brings the adsorbent bed up to about the feed gas pressure.

These are interesting processes but they are not highly efficient in the enrichment of natural gas. These pressure swing adsorption processes to date have not optimized the recovery of the natural gas product. The objective in increasing efficiency is to desorb essentially all of the adsorbed gas in as high a purity as possible as quickly as possible, utilizing the value of any off gases, and then put the adsorbent bed back into production as quickly as possible. This is what is accomplished in the processes of the present invention. In addition, the pressure swing adsorption processes should have a low capital cost. The present pressure swing adsorption processes produce a high purity separation requiring only three adsorbent beds and their associated valving. This is an improvement over prior art processes.

BRIEF SUMMARY OF THE INVENTION

The present invention is directed to the selective separation of a primary gas from secondary gases by means of pressure swing adsorption. In one preferred mode it is directed to the removal of nitrogen from a natural gas stream to upgrade the natural gas stream to pipeline quality. In this mode, the hydrocarbons are adsorbed and the nitrogen passes through the adsorbent bed. In another preferred mode, carbon dioxide is separated from a gas stream containing natural gas. In this mode the carbon dioxide is preferentially adsorbed with the hydrocarbon gases passing through the adsorbent bed. The carbon dioxide and natural gas are each valuable products.

The pressure swing adsorption process comprises the use of three adsorbent beds, each sequentially going through the phases of (a) adsorption; (b) first depressurization, (c) recycle; (d) second depressurization; (e) evacuation; (f) secondary gas pressurization; and (g) main pressurization.

The adsorption phase consists of flowing the feed gas cocurrently through an adsorbent bed until the secondary gas front in the adsorbent bed approaches the exit of the adsorbent bed. At this point the feed gas is stopped and the adsorbent bed is put onto the first depressurization phase. The secondary gas is the gas that is weakly adsorbed by the adsorbent bed.

The first depressurization phase consists of reducing the pressure in the adsorbent bed to remove some of the non-adsorbed gases that are present in and between the adsorbent particles. This gas stream will have a gas composition similar to that of the feed gas. This depressurization gas is used to pressurize the adsorbent bed that is to enter an adsorption phase or can be used as a fuel source when it is a hydrocarbon containing gas. Preferably, this is conducted countercurrently.

The recycle phase consists of passing a second depressurization gas, preferably countercurrently into the present adsorbent bed in order to further remove the non-adsorbed gas in the void space between the adsorbent particles and to desorb some adsorbed secondary product gas. As a recycle feed gas exits the adsorbent bed in a recycle phase it is stored or fed to an adsorbent bed that now is on a main pressurization phase. At the completion of the recycle phase the void space and the adsorbent will contain more than 90 percent primary product, and preferably more than 95 percent primary product. At this point, the adsorbent bed undergoes a second depressurization phase.

The second depressurization phase comprises reducing the pressure of the adsorbent bed and flowing the released gas, preferably countercurrently, from the adsorbent bed to a bed which has just completed a first depressurization phase. This is a gas stream which contains more than 90 percent primary product, and preferably more than 95 percent primary product. This adsorbent bed then undergoes an evacuation phase.

The evacuation phase consists of reducing the pressure on the adsorbent bed and flowing the gas countercurrently from the adsorbent bed. The evacuation is conducted at a much reduced pressure, and preferably under a vacuum of at least 20 inches of mercury and preferably 28 inches of mercury or more. The evacuation gas is a primary product which can be compressed for transport or use. The adsorbent bed then undergoes a secondary product gas pressurization phase.

The secondary product gas pressurization phase consists of countercurrently flowing a secondary product gas from an adsorbent bed on an adsorption phase into this adsorbent bed. The absolute pressure of this adsorbent bed will rise to about half of the operating adsorption phase pressure. The adsorbent bed then enters a main pressurization phase which consists of flowing the gas from the adsorbent bed on a first depressurization phase and a recycle phase into this adsorbent bed along with the feed gas stream. The gas flow into this adsorbent bed preferably is cocurrent. The adsorbent bed then repeats the cycle by undergoing an adsorption step by the flow of feed gas into the adsorbent bed.

Each adsorbent bed in turn undergoes the same process phases in sequence. While one adsorbent bed is undergoing one phase, the other adsorbent beds are undergoing other phases. The timing of the phases can vary. However, in a preferred embodiment, the combined first depressurization, recycle, and second depressurization phases will have about the same timing as the combined secondary gas pressurization, main pressurization and adsorption phases. The evacuation phase alone in this preferred embodiment will have the timing equivalent to these combined phases. Upon exiting the pressure swing adsorption process the primary product gas will be ready for transport or use.

The present pressure swing adsorption process conserves the more highly adsorbed product gas. This is accomplished by taking the gas from an adsorbent bed that is being depressurized and flowing this gas into an adsorbent bed that has completed an adsorption phase. This resulting recycle gas removes gas of about feed gas composition from the adsorbent bed void space and removes a secondary gas which has been adsorbed in the pores of the adsorbent. This recycle feed gas then is fed to an adsorbent bed that will be undergoing an adsorption phase. In this way, the content of the more strongly adsorbed component is maintained in the pressure swing system. The only gases exiting the pressure swing system are a high purity primary product gas and a high purity less strongly adsorbed secondary product gas. By maintaining the more strongly adsorbed component in the pressure swing system until separated from the other gases the efficiency of the system is increased.

This pressure swing adsorption process is particularly adapted for use in separating nitrogen from natural gas and natural gas from carbon dioxide. In the separation of nitrogen from natural gas the natural gas is preferentially adsorbed and is the primary product gas. Nitrogen is the secondary product gas. In the separation of carbon dioxide from natural gas the carbon dioxide is preferentially adsorbed and is the primary product gas and the natural gas is the secondary product gas. All of these gases can be collected for use. All are commercially valuable gases.

DETAILED DESCRIPTION OF THE INVENTION

The present process is directed to the separation of a primary product gas and a secondary product gas. The primary product gas is the component adsorbed by the adsorbent bed. This process is a pressure swing adsorption process wherein the primary product gas such as natural gas or carbon dioxide is preferentially adsorbed by the adsorbent. Preferential adsorption is the technique where one or more substances are more strongly adsorbed than other substances. In this phenomenon essentially all of the substances are adsorbed by the adsorbent to some degree. As the adsorption progresses, the more strongly adsorbed gases become concentrated on the adsorbent and feed gases occupy the space within the adsorbent. The net result is that at the time of breakthrough of feed gas from the bed the more strongly adsorbed primary product gas components to a large extent have saturated the adsorbent bed while the less strongly adsorbed secondary product gas components to a large extent have exited the adsorbent bed.

In the present pressure swing adsorption process the adsorbent preferably is a porous carbon such as activated carbons and carbon molecular sieves. The activated carbon can be derived from wood, coal, coconut or petroleum sources. The requirement is that the activated carbon have a selectivity for the primary product gas greater than that for the secondary product gas and other gases. The adsorbent characteristics that determine selectivity for hydrocarbons include pore structure, pore size and treatment conditions. Useful activated carbons have a carbon tetrachloride number of about 60, a surface square of more than about 1150 sq. meters/g., a density of about 0.45 g./cc. and an average particle diameter of about 3 mm to 5 mm, and preferably about 4 mm. However, any adsorbent can be used as long as it has greater selectivity for one component than for another.

Pressure swing adsorption systems are usually comprised of two or more adsorbent beds. The number of adsorbent beds used is the number that provides the better overall economic benefit. That is, the pressure swing adsorption system that is selected must give the lowest overall cost considering the capital cost of the equipment and the operating cost. In this regard most pressure swing adsorption systems are cost effective when three to five adsorbent beds are used. In the present pressure swing adsorption process three adsorbent beds are used. The economics are very favorable using three adsorbent beds.

Figure 1:
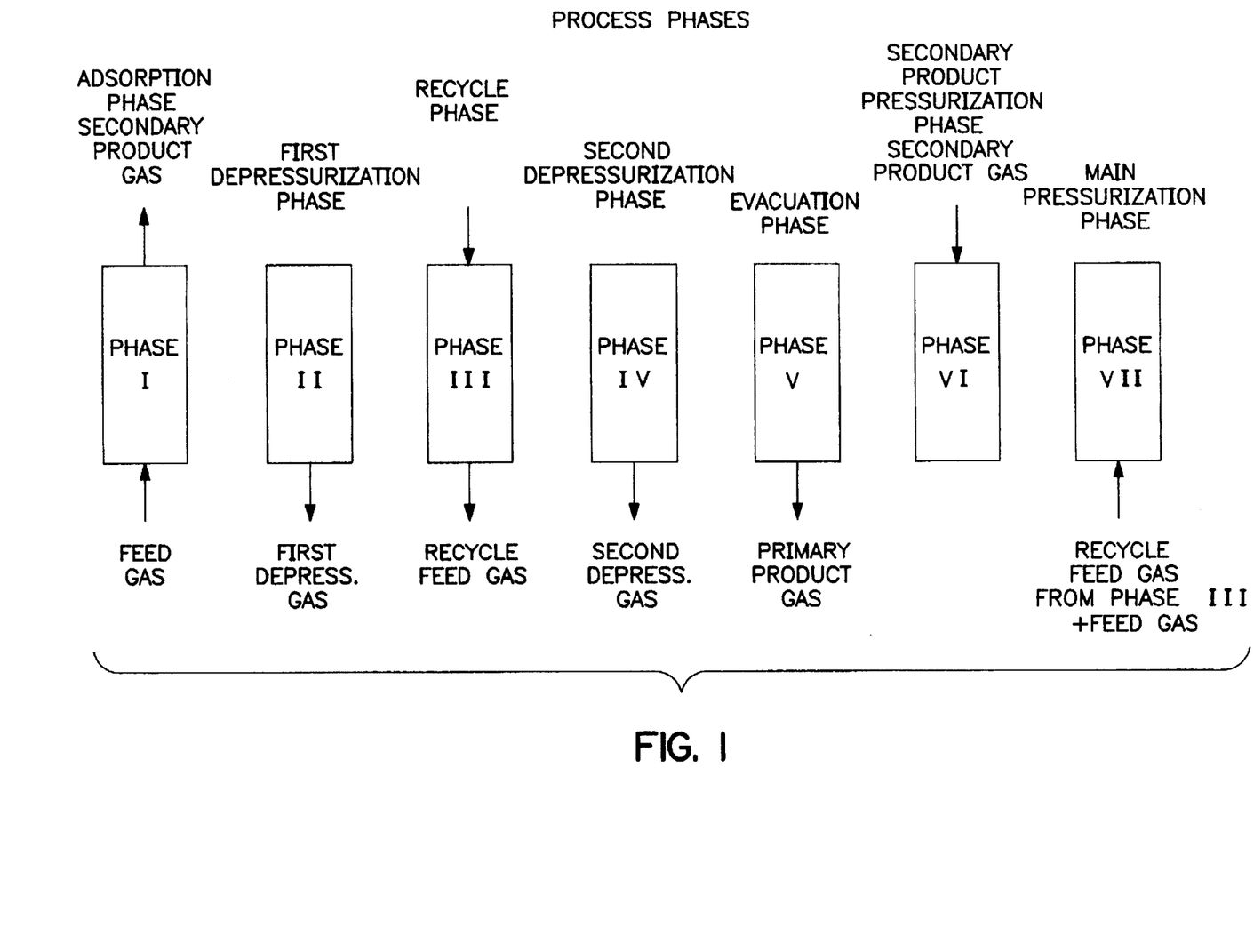
FIG. 1 sets out in a schematic form the seven phases used in the adsorbent bed pressure swing adsorption system.

FIG. 1 sets out in a schematic diagram the preferred three adsorbent bed pressure swing adsorption system. For illustration purposes, this process will be described for the enrichment of the hydrocarbon content of a natural gas stream. If this natural gas stream contains significant amounts of hydrogen sulfide, it will be pretreated by scrubbing with monoethanolamine. The feed gas can be dried by treatment with diethylene glycol or triethylene glycol or by passage through a bed of alumina, silica or aluminosilicate zeolites. The feed to the pressure swing adsorption system in FIG. 1 will be a gas containing primarily hydrocarbons and nitrogen. There will be minor amounts of other gasses present.

As schematically described in FIG. 1 the process consists of seven phases. These are an adsorption phase, a first depressurization phase, a recycle phase, a second depressurization phase, an evacuation phase, a nitrogen secondary gas pressurization phase and a main pressurization phase. In the Phase I adsorption phase, feed gas is fed to an adsorbent bed until the feed gas is about to exit the adsorbent bed. This is breakthrough when the feed gas will exit the adsorbent bed. At this point the input of the feed gas ceases and the adsorbent bed undergoes a Phase II first depressurization phase. During the adsorption phase, an adsorption front moves toward the exit end of the adsorbent bed. Before the adsorption front the gases in the adsorbent bed consist of the more lightly adsorbed or non-adsorbed secondary product gases. These are the gases that have not been adsorbed and the gases in the void space. Behind the adsorption front the gases are primarily the feed gas and the adsorbed gases on the adsorbent.

In a first step of regeneration following an adsorption phase this adsorbent bed undergoes the Phase II first depressurization phase. The first depressurization comprises the reducing of the pressure in the adsorbent bed from the adsorption pressure to a first lower pressure. During this first depressurization gases primarily are removed from the spaces between the adsorbent particles and flowed, preferably countercurrently, from the adsorbent bed. These gases will have a composition about that of the feed gas. These first depressurization gases can be flowed along with recycle feed gas to the adsorbent bed that will enter an adsorption phase to pressurize this adsorbent bed or they can be used for their fuel value in the operation of the pressure swing adsorption system.

The adsorbent bed then enters a Phase III recycle phase. This phase removes additional feed gas from the void space of the adsorbent bed and secondary product gas from the adsorbent. In this recycle phase, a second depressurization gas from an adsorbent bed undergoing a second depressurization is flowed, preferably countercurrently, through this adsorbent bed with the effluent recycle feed gas flowed to an adsorbent bed on a Phase VII main pressurization phase. At the completion of the recycle phase the adsorbent bed will contain 90 percent or more, and preferably 95 percent or more, of the more strongly adsorbed primary product gas components. This adsorbent bed then undergoes a Phase IV second depressurizing phase.

In the Phase IV second depressurization, the pressure in the adsorbent bed is reduced and an effluent gas flowed, preferably countercurrently from the adsorbent bed. This depressurization gas is fed to storage and ultimately to the adsorbent bed that is entering a Phase III recycle phase. The second depressurization gas will contain more than 90 percent by volume, and preferably more than 95 percent by volume, of the more strongly adsorbed hydrocarbon components. The adsorbent bed then undergoes a Phase V evacuation phase.

In the Phase V evacuation phase a vacuum is drawn on the adsorbent bed to a vacuum of more than about 20 inches of Hg and preferably to more than about 28 inches of Hg. The evacuation gas flows countercurrently from the adsorbent bed. This gas is comprised of the more strongly adsorbed components which in the present process is the primary product gas which has a purity of 98 percent or more by volume. This is recovered as the primary product gas. The adsorbent bed then undergoes repressurization to feed gas pressure.

The Phase VI secondary product gas pressurization phase consists of flowing the less strongly adsorbed effluent secondary product gas from an adsorbent bed on a Phase I adsorption phase into the adsorbent bed being repressurized. Preferably this flow is countercurrent. This secondary product gas pressurization plus the phase VII main pressurization by the cocurrent flow of gases into this adsorbent bed brings this adsorbent bed up to the feed gas pressure. The main pressurization phase consists of flowing the recycle feed gas, feed gas and optionally some or all of the first depressurization gas into this adsorbent bed that will enter into an adsorption phase.

Figure 2:
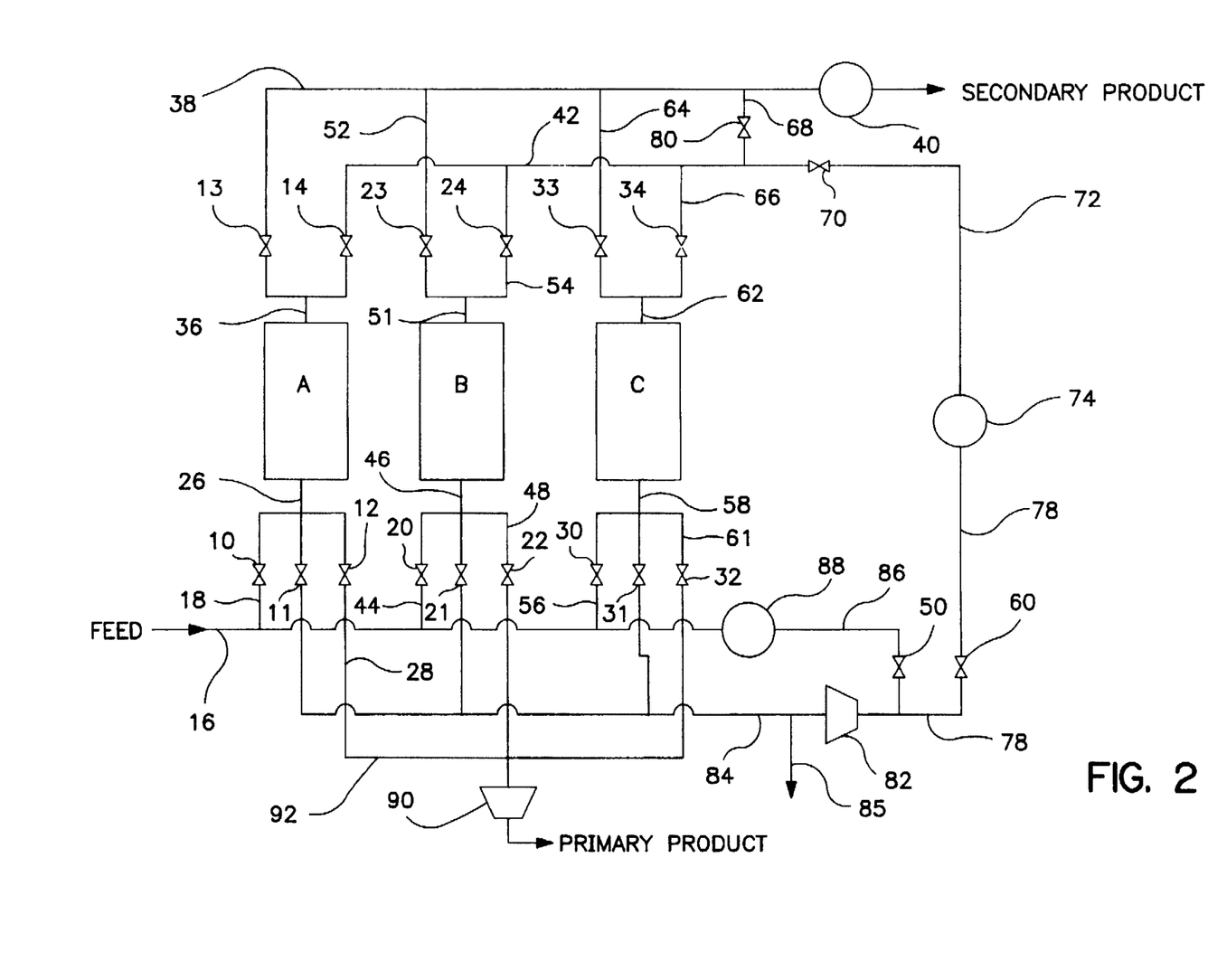
FIG. 2 is a schematic of a three adsorbent bed system for the separation of primary product gas from a gas containing a primary product gas and a secondary product gas.

Table I sets out the valve operating sequence for the schematic chart of FIG. 2. The valves listed in the table are open for the noted time sequence. All other valves are closed. The a, b and c designation are the phase times for each time sequence. The evacuation phase is the only phase that functions over a full a, b, and c time sequence. For the other phases, secondary product pressurization, main pressurization and adsorption take up one time sequence. First depressurization, recycle and second depressurization phases take up another time sequence.

TABLE I

| Adsorbent Bed | OPEN VALVE | | | | | | | | |
|---|---|---|---|---|---|---|---|---|---|
| | Time Sequence I | | | Time Sequence II | | | Time Sequence III | | |
| Misc. Valves | a | b | c | a | b | c | a | b | c |
| A | 14 | 10 | 10; 13 | 11 | 11; 14 | 11 | 12 | 12 | 12 |
| B | 21 | 21, 24 | 21 | 22 | 22 | 22 | 24 | 20 | 20, 23 |
| C | 32 | 32 | 32 | 34 | 30 | 30, 33 | 31 | 31, 34 | 31 |
| Misc. Valves | 50; 80 | 50; 70 | 60 | 50; 80 | 50; 70 | 60 | 50; 80 | 50; 70 | 60 |

Prior to adsorbent bed A entering into an adsorption Phase I, this adsorbent bed must be pressurized. This description of the gas flows and valve operation will be discussed with reference to adsorbent bed A entering into a nitrogen (secondary product) pressurization Phase VI. During this phase, valve 14 is open as is valve 80. Nitrogen gas passes from reservoir 40 through conduits 38, 68, 42 and 36 and into adsorbent bed A. During this same time valve 32 of adsorbent bed C is open with an evacuation phase primary product gas passing from adsorbent bed C through conduits 58 and 61 to vacuum pump 90. This gas is the primary product, natural gas. Concurrently, valves 21 and 50 are open with adsorbent bed B undergoing a first depressurization phase I.

Adsorbent bed A then undergoes a main pressurization phase VII. Valve 10 is open with recycle feed gas flowing through conduits 16, 18, and 26 from reservoir 88. Adsorbent bed C continues in an evacuation phase V. Adsorbent bed B is a recycle phase III and has valves 21 and 24 open. Gas flows from reservoir 74 through conduits 72, 42, 54 and 51 and into adsorbent bed B. A recycle feed gas flows from this adsorbent bed through conduits 46, 84, and 86 to reservoir 88. This recycle feed gas is used for main pressurization and can also be used as a feed gas.

In the next period of time, valves 10 and 13 are open for adsorbent bed A which is on an adsorption phase with a secondary product exiting at conduits 36 and flowing to secondary product reservoir 40 through conduit 38. During this time adsorbent bed C continues in evacuation phase V. Adsorbent bed B is in a second depressurization phase IV. Valve 21 is open in adsorbent bed B with a second depressurization gas flowing through conduits 46, 84, 78 and 76 and valve 60 to reservoir 74. This gas will be used as recycle gas in the recycle phase. This completes a first time sequence of valve operation.

In the second time sequence of operation adsorbent bed A will undergo a depressurization phase II, recycle phase III and a depressurization phase IV; adsorbent bed C, a nitrogen gas pressurization phase VI, main pressurization phase VII and adsorption phase I; and adsorbent bed B evacuation phase V. In the first part of this second time period valve 11 of adsorbent bed A is open as is valve 50. A first depressurization gas flows from this adsorbent bed through conduits 26 and 84 to vacuum pump 82 and then via conduit 86 to reservoir 88 or flowed through conduit 85 (appropriately valved) for use as a fuel gas. Valve 34 is open in adsorbent bed C as is valve 80 with a nitrogen pressurization gas flowing from reservoir 40 through conduits 68, 42, 66, and 62 and into adsorbent bed C. Adsorbent bed B is being evacuated with valve 22 open and gas flowing through conduits 48 and 92 to compressor 90. This is a primary product natural gas.

Adsorbent bed A then enters into a recycle phase with valves 11 and 14 open. Gas flows from reservoir 74 through conduits 72, 42 and 36 and exits through conduits 26, 84 and 86 to reservoir 88. Adsorbent bed C undergoes a main pressurization phase VII with valve 30 open and gas flowing from reservoir 88 and through conduit 16. Adsorbent bed B continues on an evacuation phase V.

In the next part of this time sequence adsorbent bed A undergoes a second depressurization phase IV with valve 11 open and gas flowing through conduits 26, 84, 78 and 76 to reservoir 74 to be used in recycle phase III. Adsorbent bed C undergoes an adsorption phase I with feed gas flowing into this bed through conduit 56 and exiting at conduit 64. This gas flows by conduit 38 to reservoir 40. During this time adsorbent bed B continues on the evacuation phase V.

In the third sequence of time adsorbent bed A undergoes an evacuation phase V; adsorbent bed C a first depressurization phase II, recycle phase III and a second depressurization phase IV; and adsorbent bed B a nitrogen (secondary product) pressurization phase VI, a main pressurization phase VII and an adsorption phase I. Valve 12 is open for adsorbent bed A with a natural gas primary product flowing through conduits 26, 28 and 92 to vacuum pump 90. During this time valve 31 is open in adsorbent bed C with a first depressurization gas flowing through conduits 58, 84 and 86 to reservoir 88. During the period of time valve 24 is open on adsorbent bed B with a nitrogen secondary product gas flowing from reservoir 40 through conduits 68, 54 and 51 to this adsorbent bed B.

In the next part of this period of time adsorbent bed A continues in an evacuation phase V. Adsorbent bed B undergoes a recycle phase III with a depressurization gas flowing from reservoir 74 through conduit 72, 42, 66 and 62 and into adsorbent bed C. A recycle feed gas exits at 31 and passes by conduits 84 and 86 to reservoir 88. During this time adsorbent bed C is undergoing a main pressurization phase VII. Gas flows from reservoir 88 through conduits 16 and 44 and into adsorbent bed B. In the next part of this time period adsorbent bed A continues in an evacuation phase V. Adsorbent bed C undergoes a second depressurization phase IV with valve 31 open and gas flowing through conduits 58, 84, 78 and 76 to reservoir 74. During this time adsorbent bed B is on an adsorption phase I with feed gas flowing through conduit 16 to conduits 44 and 46 and into adsorbent bed B. A nitrogen secondary product gas flows from this adsorbent bed through conduits 52 and 38 to reservoir 40 and to secondary product. This completes a full cycle of the operation of the process.

As noted, this process can be used to separate carbon dioxide from natural gas. In that case, the carbon dioxide is the primary product gas and natural gas the secondary product gas. Also, for this separation the operating pressure will be higher. This will be about 35 to 600 psig while separation of nitrogen from natural gas, the operating pressure is about 15 to 100 psig.

Figure 3:
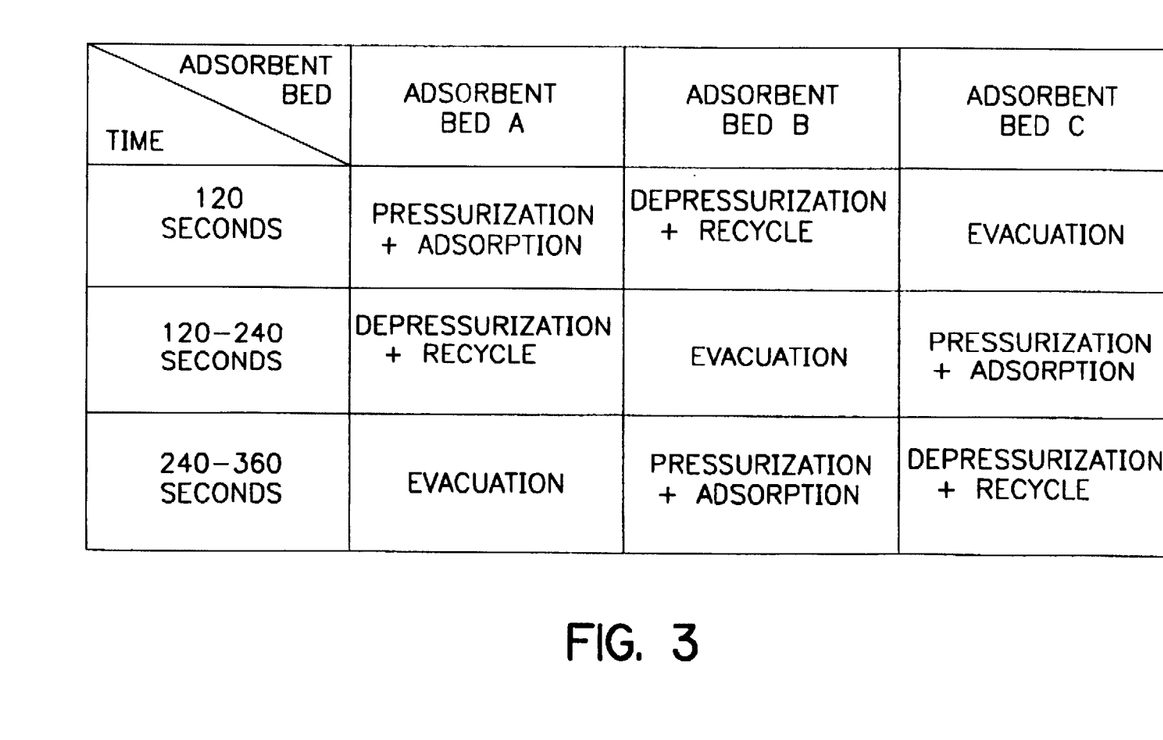
FIG. 3 sets out in tabular form the cycle times for a three adsorbent bed pressure swing adsorption system.

The phases of the process have been described for a full cycle. Upon the completion of a full cycle, the cycles are then repeated. In FIG. 3 there is a phase sequencing for a full cycle which consists of 360 seconds. This is a useful timing. The timing will be affected by many factors including feed stream composition, adsorbent bed geometry and adsorbent particle size. This phase sequence is for three adsorbent beds. Consequently, the time periods are set at 120 seconds each. In this regard one 120 seconds sequence for each adsorbent bed consists of pressurization and adsorption with a secondary gas pressurization phase, the main pressurization phase and adsorption phase. Another for each adsorbent bed is the depressurization which consists of the first depressurization phase, recycle phase and the second depressurization phase. Yet another is the evacuation phase which requires the full 120 seconds. The adsorption part of the sequence can be up to 90 seconds, but usually will be about 45 to 75 seconds depending on factors such as the more strongly adsorbed hydrocarbon content of the feed gas. The time allocated for both the secondary gas pressurization phase and the main pressurization phase will be about 30 to 45 seconds. This will be divided between these two phases. Adsorption should be continued until just prior to breakthrough and then the first depressurization phase of the sequence is initiated. The depressurization segments will be at essentially time of 40 seconds each.

The adsorbent beds sequentially go through these phase sequences in the order as set out in FIG. 3. In Table 1 there is set out the position of the open valves for a full cycle of operation. All valves not noted as open are closed. The valve numbers are with reference to the schematic diagram of FIG. 2. By reference to Table 1 and FIG. 2 the operation of a full cycle of 360 seconds (or other timing) of the pressure swing adsorption process can be conducted.

The size of each adsorbent bed will depend on the particular gas stream, gas flows, hydrocarbon content and other factors such as capital cost. The adsorbent beds will range in height of from about 2 to 15 meters or more. The width or diameter of each adsorbent bed will be from about 1.5 meters to 4 meters or more. Each bed will contain from 1000 pounds to 40,000 pounds of adsorbent. The flow rate of gas through the beds will be in the range of about 300 to 7000 scf/minute depending on the adsorbent bed size.

Standard piping, valves and controllers can be used. The on/off valves will usually be butterfly valves. Throttle valves and check valves are used where noted. In most instances the system will be computer controlled, with built in safeguards.

The preferred embodiments of the present hydrocarbon recovery processes have been disclosed in this specification. However, various modifications can be made to the processes and yet comprise the present concepts. Such modifications are considered to be within the present discoveries.

EXAMPLE

A natural gas stream having a hydrocarbon content of 70 percent by volume and a nitrogen content of 30% by volume is fed at a pressure of 50 psia to a pressure swing adsorption system as shown in FIG. 2 where the adsorbent beds each contain about 4250 pounds of activated carbon adsorbent. The cycle timing is as shown in FIG. 3 with adsorption being 60 seconds, nitrogen pressurization 30 seconds and main pressurization with recycle feed gas and feed gas is 30 seconds. The feed flow rate is 860 SCFM. The output product natural gas is pipeline quality at a purity of 98 percent hydrocarbons by volume. The product gas is produced at a rate of 590 SCFM. The pressure swing system operates continuously until the system needs maintenance.

What is claimed is:

1. A method for purifying a gas stream containing at least a primary gas and a secondary gas by flowing said stream through a plurality of adsorbent beds each containing an adsorbent which selectively adsorbs said primary gas with said secondary gas substantially passing therethrough, cycling each of said adsorbent beds sequentially through a series of phases comprising an adsorption phase, a first depressurization phase, a recycle phase, a second depressurization phase, an evacuation phase, a secondary gas pressurization phase and a main pressurization phase, said adsorption phase comprising passing said gas stream into a first adsorbent bed at an elevated pressure for a part of a first period of time with said primary gas being adsorbed therein and collecting a portion of said secondary gas substantially passing therethrough for use in pressurizing an adsorbent bed that is to enter said adsorption phase, while said first adsorbent bed is in said adsorption phase depressurizing a second adsorbent bed in said first depressurization phase to a first lower pressure to produce a first depressurization gas, flowing a second depressurization gas into said second adsorbent bed and collecting a recycle feed gas therefrom for use at least in further pressurizing said adsorbent bed that is to enter said adsorption phase, further depressurizing said second adsorbent bed in said second depressurization phase to produce said second depressurization gas, and evacuating a third adsorbent bed in said evacuation phase to a lowest pressure and recovering said primary product gas, said first adsorbent bed prior to undergoing said adsorption phase being pressurized with a portion of the collected secondary gas from said adsorption phase and with a portion of the collected recycle feed gas in said main pressurization phase.

2. A method as in claim 1 wherein said primary gas is natural gas and said secondary gas is nitrogen.

3. A method as in claim 2 wherein said gas stream is fed to said first adsorbent bed at a pressure of about 20 psig to about 100 psig.

4. A method as in claim 1 wherein said primary gas is carbon dioxide and said secondary gas is natural gas.

5. A method as in claim 4 wherein said gas stream is fed to said first adsorbent bed at a pressure of about 35 psig to about 600 psig.

6. A method as in claim 1 wherein said first depressurization gas is fed to said first adsorbent bed along with the collected recycle feed gas in said main pressurization phase.

7. A method as in claim 1 wherein said first depressurization gas is flowed countercurrently from said second adsorbent bed and said second depressurization gas is flowed countercurrently from said second adsorbent bed.

8. A method as in claim 1 wherein said second depressurization gas is flowed countercurrently through said second adsorbent bed to produce said recycle feed gas.

9. A method as in claim 1 wherein said adsorbent is a porous carbon selected from the group consisting of activated carbons and carbon molecular sieves.

10. A method for purifying a gas stream containing primarily hydrocarbon gases and nitrogen by flowing said gas stream through a plurality of adsorbent beds each containing an adsorbent which selectively adsorbs said hydrocarbon gases with said nitrogen gas substantially passing therethrough, cycling each of said adsorbent beds sequentially through a series of phases comprising an adsorption phase, a first depressurization phase, a recycle phase, a second depressurization phase, an evacuation phase, a nitrogen pressurization phase and a main pressurization phase, said adsorption phase comprising passing said gas stream into a first adsorbent bed at an elevated pressure for a part of a first period of time with said hydrocarbon gases being adsorbed therein and collecting a portion of said nitrogen gas substantially passing therethrough for use in pressurizing an adsorbent bed that is to enter said adsorption phase, while said first adsorbent bed is in said adsorption phase depressurizing a second adsorbent bed in said first depressurization phase to a first lower pressure to produce a first depressurization gas, flowing a second depressurization gas into said second adsorbent bed and collecting a recycle feed gas therefrom for use at least in further pressurizing said adsorbent bed that is to enter said adsorption phase, further depressurizing said second adsorbent bed in a second depressurization phase to produce said second depressurization gas, and evacuating a third adsorbent bed in said evacuation phase to a lowest pressure and recovering a hydrocarbon gas product containing substantially hydrocarbon gases, said first adsorbent bed prior to undergoing said adsorption phase being repressurized with a portion of the collected nitrogen gas from said adsorption phase and with a portion of the collected recycle feed gas in said main pressurization phase.

11. A method as in claim 10 wherein said gas stream is fed to said first adsorbent bed at a pressure of about 20 psig to about 100 psig.

12. A method as in claim 10 wherein said adsorbent is a porous carbon selected from the group consisting of activated carbons and carbon molecular sieves.

13. A method as in claim 10 wherein said first depressurization gas is flowed countercurrently from said second adsorbent bed and said second depressurization gas is flowed countercurrently from said second adsorbent bed.

14. A method as in claim 10 wherein said second depressurization gas is flowed countercurrently through said second adsorbent bed to produce said recycle feed gas.

15. A method for purifying a gas stream containing primarily hydrocarbon gases and carbon dioxide gas by flowing said stream through a plurality of adsorbent beds each containing an adsorbent which selectively adsorbs said carbon dioxide gas with said hydrocarbon gases substantially passing therethrough, cycling each of said adsorbent beds sequentially through a series of phases comprising an adsorption phase, a first depressurization phase, a recycle phase, a second depressurization phase, an evacuation phase, a hydrocarbon gases pressurization phase and a main pressurization phase, said adsorption phase comprising passing said gas stream into a first adsorbent bed at an elevated pressure for a part of a first period of time with said carbon dioxide being adsorbed therein and collecting a portion of said hydrocarbon gases substantially passing therethrough for use in pressurizing an adsorbent bed that is to enter said adsorption phase, while said first adsorbent bed is in said adsorption phase depressurizing a second adsorbent bed in said first depressurization phase to a first lower pressure to produce a first depressurization gas, flowing a second depressurization gas into said second adsorbent bed and collecting a recycle feed gas therefrom for use at least in further pressurizing said adsorbent bed that is to enter said adsorption phase, further depressurizing said second adsorbent bed in said second depressurization phase to produce said second depressurization gas, and evacuating a third adsorbent bed in said evacuation phase to a lowest pressure and recovering a carbon dioxide gas product containing substantially carbon dioxide gas, said first adsorbent bed prior to undergoing said adsorption phase being repressurized with a portion of the collected hydrocarbon gases from said adsorption phase and with a portion of the collected recycle feed gas in said main pressurization phase.

16. A method as in claim 15 wherein said gas stream is fed to said first adsorbent bed at a pressure of about 35 psig to about 600 psig.

17. A method as in claim 15 wherein said adsorbent is a porous carbon selected from the group consisting of activated carbons and carbon molecular sieves.

18. A method as in claim 17 wherein said adsorbent is an activated carbon.

19. A method as in claim 15 wherein said first depressurization gas is flowed countercurrently from said second adsorbent bed and said second depressurization gas is flowed countercurrently from said second adsorbent bed.

20. A method as in claim 15 wherein said second depressurization gas is flowed countercurrently through said second adsorbent bed to produce said recycle feed gas.

* * * * *